US009986382B1

United States Patent
Liu et al.

(10) Patent No.: US 9,986,382 B1
(45) Date of Patent: May 29, 2018

(54) METHOD AND APPARATUS FOR DETERMINING RELATIONSHIP BETWEEN POINTS OF INTEREST

(71) Applicant: BAIDU ONLINE NETWORK TECHNOLOGY (BEIJING) CO., LTD., Beijing (CN)

(72) Inventors: Qing Liu, Beijing (CN); Weiyu Chen, Beijing (CN); Yu Xu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days. days.

(21) Appl. No.: 15/618,007

(22) Filed: Jun. 8, 2017

(30) Foreign Application Priority Data

Dec. 23, 2016 (CN) .......................... 2016 1 1208174

(51) Int. Cl.
| | |
|---|---|
| H04W 24/00 | (2009.01) |
| H04W 4/02 | (2018.01) |
| H04W 4/04 | (2009.01) |
| H04W 64/00 | (2009.01) |
| G06Q 30/02 | (2012.01) |

(52) U.S. Cl.
CPC .......... H04W 4/023 (2013.01); H04W 4/043 (2013.01); H04W 64/003 (2013.01); G06Q 30/0259 (2013.01)

(58) Field of Classification Search
CPC ... H04W 4/023; H04W 4/043; G06Q 30/0259
USPC .......... 455/456.3, 456.1, 414.1, 422.1, 432.3
See application file for complete search history.

(56) References Cited

U.S. PATENT DOCUMENTS

| | | | | |
|---|---|---|---|---|
| 2010/0009659 | A1* | 1/2010 | Netanel | H04L 63/06 455/411 |
| 2014/0179340 | A1* | 6/2014 | Do | G01S 5/021 455/456.1 |
| 2015/0237487 | A1* | 8/2015 | Titcombe | H04W 4/14 455/466 |

* cited by examiner

Primary Examiner — Nghi H Ly
(74) Attorney, Agent, or Firm — Ladas & Parry, LLP

(57) ABSTRACT

The present disclosure provides a method and apparatus for determining relationship between POIs. The method comprises: obtaining a WiFi fingerprint uploaded by the user, the WiFi fingerprint comprising information of a wireless access point AP listing at a location where the user lies; determining a POI corresponding to each AP in each WiFi fingerprint; if the number of times that APs respectively corresponding to any two POIs occur in the same WiFi fingerprint exceeds a first threshold, determining the two POIs as being in a neighboring relationship. The solution of the present disclosure may be employed to save costs of manpower and material resources and improve accuracy of information.

18 Claims, 1 Drawing Sheet

METHOD AND APPARATUS FOR DETERMINING RELATIONSHIP BETWEEN POINTS OF INTEREST

The present application claims the priority of Chinese Patent Application No. 201611208174.2, filed on Dec. 23, 2016, with the title of "METHOD AND APPARATUS FOR DETERMINING RELATIONSHIP BETWEEN POINTS OF INTEREST", the contents of which are incorporated herein by reference.

FIELD OF THE DISCLOSURE

The present disclosure relates to network technologies, and particularly to a method and apparatus for determining relationship between points of interest.

BACKGROUND OF THE DISCLOSURE

In practical life, points of interest (POIs) usually do not exist independently but in an associated relationship, for example, in a neighboring relationship. The POIs may be shops or the like.

It is of great practical significance to determine the neighboring relationship between POIs, for example, when a user is positioned in a certain shop, it is feasible to push goods information in other shops in the neighboring relationship with the shop to the user.

In the prior art, the following manners are usually employed to determine the neighboring relationship between POIs:

1) determining shops in the neighboring relationship by parsing a planar graph of each floor of a shopping mall;
2) determining shops in the neighboring relationship by matching information such as addresses, door number plates and shop serial numbers.

However, the above two manners have certain problems in practical application, for example:

Regarding manner 1), it is necessary to consume a lot of manpower and material resources to collect planar graphs of all floors of all shopping malls, and it is necessary to re-collect if planar graphs are updated;

Regarding manner 2), it is also necessary to consume a lot of manpower and material resources to accurately obtain complete addresses of all shops, which will otherwise cause inaccurate information.

SUMMARY OF THE DISCLOSURE

In view of the above, the present disclosure provides a method and apparatus for determining relationship between points of interest, which can save manpower and material resources and improve accuracy of information.

Specific technical solutions are presented as follows:

A method for determining relationship between POIs, comprising:
  obtaining a WiFi fingerprint uploaded by the user, the WiFi fingerprint comprising information of a wireless access point AP listing at a location where the user lies;
  determining a POI corresponding to each AP in each WiFi fingerprint;
  if the number of times that APs respectively corresponding to any two POIs occur in the same WiFi fingerprint exceeds a first threshold, determining the two POIs as being in a neighboring relationship.

An apparatus for determining relationship between POIs comprises an obtaining unit and a processing unit;

the obtaining unit is configured to obtain a WiFi fingerprint uploaded by the user, and transmit it to the processing unit, the WiFi fingerprint comprising information of an AP listing at a location where the user lies;

the processing unit is configured to determine a POI corresponding to each AP in each WiFi fingerprint, and determine the two POIs as being in the neighboring relationship if the number of times that APs respectively corresponding to any two POIs occur in the same WiFi fingerprint exceeds a first threshold.

As can be seen based on the introduction, the technical solutions of the present disclosure may be employed to determine the neighboring relationship between POIs by using the user-uploaded WiFi fingerprint including the information of the AP listing at the location where the user lies, and determine that the two POIs as being in the neighboring relationship if the number of times that APs respectively corresponding to any two POIs occur in the same WiFi fingerprint exceeds the first threshold, thereby overcoming the problems existing in the prior art, saving manpower and material resources, and improving accuracy of information.

DETAILED DESCRIPTION OF PREFERRED EMBODIMENTS

To make technical solutions of the present disclosure clearer and more apparent, the technical solutions of the present disclosure will be further described in detail by referring to figures and presenting embodiments.

Embodiment 1

Figure 1:
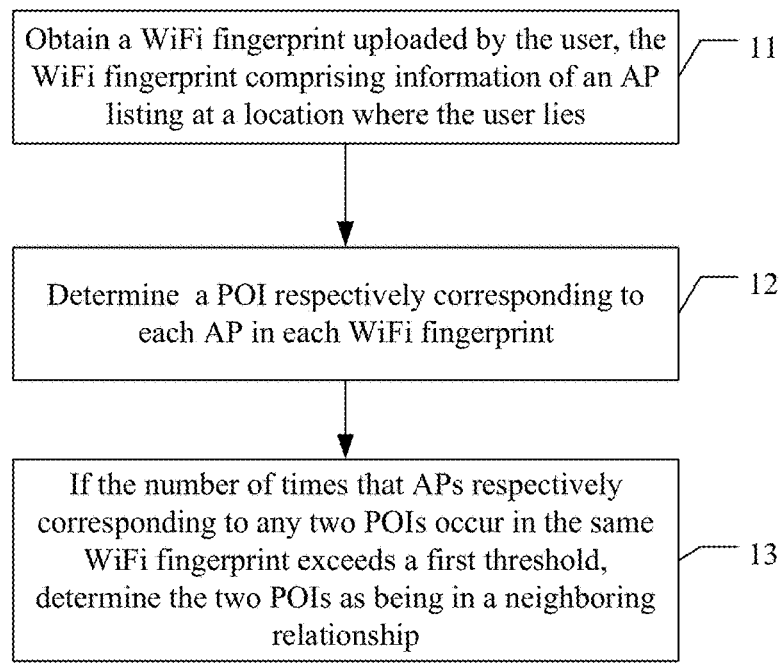
FIG. 1 is a flow chart of a method embodiment of determining relationship between POIs according to the present disclosure.

FIG. 1 is a flow chart of a method embodiment of determining relationship between POIs according to the present disclosure. As shown in FIG. 1, the method comprises the following steps:

At step 11, a WiFi fingerprint uploaded by the user is obtained, wherein the WiFi fingerprint comprises information of a listing of access points (APs) at a location where the user lies.

While the user activates a fingerprint reporting function while using a smart terminal such as a mobile phone, the mobile phone will periodically report the user's WiFi fingerprint.

As stated above, the WiFi fingerprint includes information of the AP listing at the location where the user lies. The AP listing may comprise information such as Service Set Identifier (SSID) and signal intensity of APs.

At step 12 is determined a POI corresponding to each AP in each WiFi fingerprint.

It is feasible to pre-establish a correspondence relationship between the AP and POI, namely, with respect to each AP, respectively store a correspondence relationship between the SSID of the AP and a name or identifier of the corresponding POI.

How to obtain the above correspondence relationship is not limited there.

At step 13, if the number of times that APs respectively corresponding to any two POIs occur in the same WiFi fingerprint exceeds a first threshold, the two POIs are determined as being in the neighboring relationship.

In practical application, the following processing is performed one time every a time period:

Statistics and analysis are performed for WiFi fingerprints obtained in the time period, and the two POIs are determined as being in the neighboring relationship if it is determined that the number of times that APs respectively corresponding to any two POIs occur in the same WiFi fingerprint exceeds the first threshold.

A specific time length of the time period and a specific value of the first threshold may depend on actual needs.

If APs respectively corresponding to two POIs occur in the same WiFi fingerprint, this indicates that the two POIs are probably neighboring POIs. Therefore, when APs respectively corresponding to two POIs frequently occur in the same WiFi fingerprint, the two POIs may be determined as neighboring POIs, namely, the two POIs are determined as being in the neighboring relationship.

Illustration is presented by way of an example.

Assume that a total of 100 WiFi fingerprints are obtained within one time period;

Assume that there exist two POIs, POI 1 and POI 2 respectively, wherein the AP corresponding to POI 1 is AP 1, and the AP corresponding to the POI 2 is AP2;

Assume that the number of WiFi fingerprints of AP 1 and AP 2 simultaneously included in the AP listing is M and M is greater than the first threshold, POI 1 and POI 2 may be determined as being in the neighboring relationship. On the contrary, if M is smaller than or equal to the first threshold, POI 1 and POI 2 may be determined as not being in the neighboring relationship.

In practical application, there might occur the following case: the user is located at a certain position for a very long period of time and the user's mobile phone always periodically reports the user's WiFi fingerprints, and then so many WiFi fingerprints usually conform the following situation: the SSID information in the AP listing in the WiFi fingerprints reported at different moments is the same, and the signal strength might be the same or different. To prevent the above case from interfering in the statistics and analysis reports, it is feasible to merge WiFi fingerprints conforming to the above situation, i.e., only retain one WiFi fingerprint therein.

It is feasible to store the neighboring relationship between POIs determined in each time period, and regarding two POIs determined in the neighboring relationship, if the WiFi fingerprints obtained in continuous N time periods are determined as being void of the situation that that APs respectively corresponding to the two POIs occur in the same WiFi fingerprint, delete the neighboring relationship between the two POIs, N being a positive integer greater than one.

That is to say, when originally neighboring two POIs no longer simultaneously occur in any WiFi fingerprint, it may be believed that the neighboring relationship between two POIs disappears and thereby the stored neighboring relationship between the two POIs is deleted.

The specific value of N may depends on actual needs.

The above introduction is directed to how to determine the neighboring relationship between POIs. On this basis, it is further feasible to determine a hierarchical relationship between POIs, namely, determine the hierarchical relationship between the POIs according to the determined neighboring relationship between the POIs.

Specifically, as for each time period, after determining the neighboring relationship between the POI, it is feasible to perform the following processing for each POI in the neighboring relationship:

determining whether the number of POIs in the neighboring relationship with the POI is greater than a second threshold;

if yes, determining that the POI is a high-level POI, and determining a non-high-level POI in the neighboring relationship with the high-level POI as a low-level POI of the high-level POI.

A specific value of the second threshold may depend on actual needs.

An example is taken for illustration purpose:

Assume that POI 3 is in neighboring relationship with P POIs and P is greater than the second threshold, the POI 3 may be determined as the high-level POI;

Assume that none of P POIs is the high-level POI, the P POIs all are low-level POIs of the POI 3.

The above embodiment will be further described by taking a shop and a shopping mall as an example.

Correspondence relationship between names of shops and SSID of corresponding APs are pre-established respectively.

WiFi fingerprints uploaded by the user are obtained, and the shop corresponding to each AP in each WiFi fingerprint is determined respectively.

As for the WiFi fingerprints obtained in each time period, if it is determined that the number of times that APs respectively corresponding to any two shops occur in the same WiFi fingerprint exceeds the first threshold, the two shops are determined as being in the neighboring relationship.

As compared with the prior art, the above manner not only saves manpower but also improves information accuracy.

As far as shops in a shopping mall are concerned, neighboring or closely-located shops are in the neighboring relationship, while the shopping mall and shops are in the hierarchical relationship.

People groups in the shopping mall and trends of stream of people in the shopping mall may be recognized based on the neighboring relationship between shops and the hierarchical relationship between the shopping mall and the shops and by using WiFi-to-shop technology, thereby facilitating business analysis of the shopping mall and shops, optimizing address-selecting schemes of shops and improving the force of the shopping attracting investment.

In the prior art, it is usual to determine the hierarchical relationship between the shopping mall and shops according to collected longitudinal and latitudinal information of the shopping mall and shops, i.e., establish a geographical location-based hierarchical relationship according to the longitudinal and latitudinal information of the shopping mall and shops.

However, this manner requires mastery of detailed polygonal information of the shopping mall, precise longitudinal and latitudinal information of shops and the like, and is very difficult to implement. Furthermore, under the same longitude and latitude, not only shopping malls or shops appear, but also multi-functional real estate usually further includes other different types of POIs, introduces miscellaneous items and thereby increases processing complexity.

In practical application, the shopping mall is in the neighboring relationship with a majority of shops in the shopping mall, whereas a shop is only in the neighboring relationship with few shops which are neighboring or located closely.

According to the above characteristics, as for each POI in the neighboring relationship, if the number of POIs in the neighboring relationship with the POI is determined greater than the second threshold, it is possible to determine that the POI as the high-level POI such as the shopping mall, and determine the non-high-level POI in the neighboring relationship with the high-level POI as the low-level POI such as a shop of the high-level POI, thereby building the hierarchical relationship between the POIs.

As compared with the prior art, the above processing manner is implemented simply and conveniently.

Embodiment 2

Figure 2:
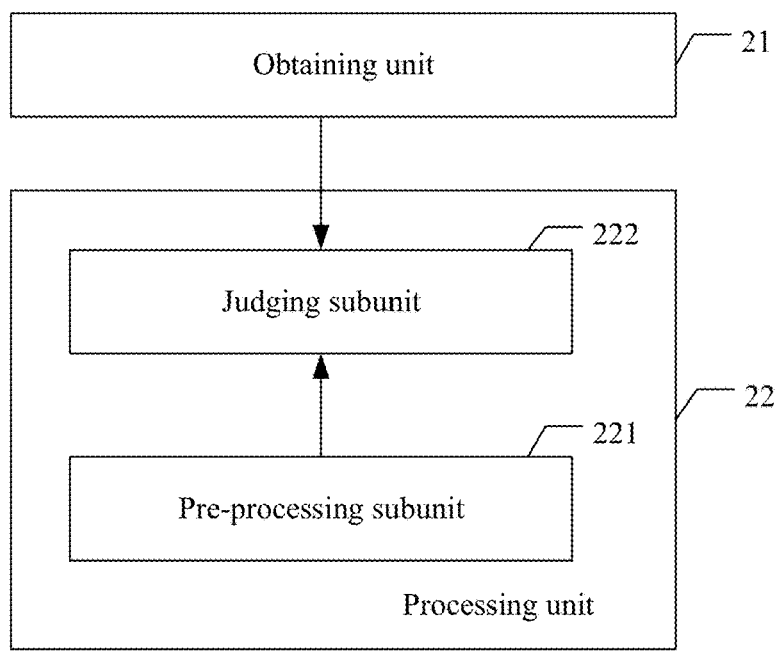
FIG. 2 is a block diagram of an apparatus embodiment of determining relationship between POIs according to the present disclosure.

FIG. 2 is a block diagram of an apparatus embodiment of determining relationship between POIs according to the present disclosure. As shown in FIG. 2, the apparatus comprises an obtaining unit 21 and a processing unit 22.

The obtaining unit 21 is configured to obtain a WiFi fingerprint uploaded by the user, and transmit it to the processing unit 22, the WiFi fingerprint comprising information of an AP listing at a location where the user lies.

The processing unit 22 is configured to determine a POI corresponding to each AP in each WiFi fingerprint, and determine the two POIs as being in the neighboring relationship if the number of times that APs respectively corresponding to any two POIs occur in the same WiFi fingerprint exceeds a first threshold.

While the user activates a fingerprint reporting function while using a smart terminal such as a mobile phone, the mobile phone will periodically report the user's WiFi fingerprint.

The WiFi fingerprint includes information of the AP listing at a location where the user lies. The AP listing may comprise information such as SSID and signal intensity of APs.

The obtaining unit 21 is configured to obtain the WiFi fingerprint uploaded by the user, and transmit it to the processing unit 22.

As shown in FIG. 2, the processing unit 22 may specifically comprise: a pre-processing subunit 221 and a judging subunit 222.

The pre-processing subunit 221 is configured to store a pre-established correspondence relationship between the AP and POI.

The judging subunit 222 is configured to, according to the correspondence relationship stored in the pre-processing subunit 221, determine a POI corresponding to each AP in each WiFi fingerprint, and determine the two POIs as being in the neighboring relationship if the number of times that APs respectively corresponding to any two POIs occur in the same WiFi fingerprint exceeds the first threshold.

Specifically, the judging subunit 222 may, every a time period, perform statistics and analysis for WiFi fingerprints obtained in the time period, and determine the two POIs as being in the neighboring relationship if it is determined that the number of times that APs respectively corresponding to any two POIs occur in the same WiFi fingerprint exceeds the first threshold.

If APs respectively corresponding to two POIs occur in the same WiFi fingerprint, this indicates that the two POIs are probably neighboring POIs. Therefore, when APs respectively corresponding to two POIs frequently occur in the same WiFi fingerprint, the two POIs may be determined as neighboring POIs, namely, the two POIs are determined as being in the neighboring relationship.

In addition, the judging subunit 222 may further perform the following processing:

Regarding two POIs determined in the neighboring relationship, if the WiFi fingerprints obtained in continuous N time periods are determined as being void of the situation that that APs respectively corresponding to the two POIs occur in the same WiFi fingerprint, delete the neighboring relationship between the two POIs, N being a positive integer greater than one.

That is to say, when originally neighboring two POIs no longer simultaneously occur in any WiFi fingerprint, it may be believed that the neighboring relationship between two POIs disappears and thereby the stored neighboring relationship between the two POIs is deleted.

The above introduction is directed to how the judging subunit 222 determines the neighboring relationship between POIs. On this basis, it is further feasible to determine a hierarchical relationship between POIs, namely, determine the hierarchical relationship between the POIs according to the determined neighboring relationship between the POIs.

Specifically, as for each POI in the neighboring relationship, if the judging subunit 222 determines the number of POIs in the neighboring relationship with the POI greater than the second threshold, it is possible to determine that the POI as the high-level POI, and determine the non-high-level POI in the neighboring relationship with the high-level POI as the low-level POI of the high-level POI, thereby building the hierarchical relationship between the POIs.

A shopping mall and shops in the shopping mall are taken as an example. Neighboring or closely-located shops are in the neighboring relationship, while the shopping mall and shops are in the hierarchical relationship.

Reference may be made to corresponding depictions in the above method embodiment for a specific workflow of the apparatus embodiment shown in FIG. 2, and the workflow will not be detailed any more herein In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

It is appreciated that what are stated above are only preferred embodiments of the present disclosure, not intended to limit the disclosure. Any modifications, equivalent replacements, improvements and the like made within the spirit and principles of the present disclosure, should all be included in the scope as protected by the present disclosure.

What is claimed is:

1. A method for determining relationship between points of interest (POIs), wherein the method comprises:
obtaining a plurality of WiFi fingerprints uploaded by a user, each of the plurality of WiFi fingerprints comprising information of a wireless access point AP listing at a location where the user locates;
determining a POI respectively corresponding to each AP in each WiFi fingerprint of the plurality of WiFi fingerprints;
when the number of times that APs respectively corresponding to any two POIs are included in a same WiFi fingerprint exceeds a first threshold, determining the two POIs as being in a neighboring relationship.

2. The method according to claim 1, wherein,
the determining a POI respectively corresponding to each AP in each WiFi fingerprint comprises:
determining a POI respectively corresponding to each AP in each WiFi fingerprint according to a pre-established correspondence relationship between the AP and the POI.

3. The method according to claim 1, wherein,
when the number of times that APs respectively corresponding to any two POIs are included in a same WiFi fingerprint exceeds a first threshold, determining the two POIs as being in a neighboring relationship comprises:
every a time period, performing statistics and analysis for WiFi fingerprints obtained in the time period, and determining the two POIs as being in the neighboring relationship when it is determined that the number of times that APs respectively corresponding to any two POIs are included in a same WiFi fingerprint exceeds the first threshold.

4. The method according to claim 3, wherein,
the method further comprises: regarding two POIs determined in the neighboring relationship, when the WiFi fingerprints obtained in continuous N time periods are determined as being void of the situation that APs respectively corresponding to the two POIs occur in a same WiFi fingerprint, deleting the neighboring relationship between the two POIs, N being a positive integer greater than one.

5. The method according to claim 3, wherein,
the method further comprises:
determining a hierarchical relationship between the POIs according to the determined neighboring relationship between the POIs.

6. The method according to claim 5, wherein,
the determining the hierarchical relationship between the POIs according to the determined neighboring relationship between the POIs comprises:
as for each POI in the neighboring relationship, when the number of POIs in the neighboring relationship with the POI is determined as being greater than a second threshold, determining that the POI as a high-level POI, and determining a non-high-level POI in the neighboring relationship with the high-level POI as a low-level POI of the high-level POI.

7. A device for determining relationship between points of interest (POIs), comprising:
at least one processor; and
a memory storing instructions, which when executed by the at least one processor, cause the at least one processor to perform operation, the operation comprising:
obtaining a plurality of WiFi fingerprints uploaded by a user, each of the plurality of WiFi fingerprints comprising information of a wireless access point AP listing at a location where the user locates;
determining a POI respectively corresponding to each AP in each WiFi fingerprint of the plurality of WiFi fingerprints;
when the number of times that APs respectively corresponding to any two POIs are included in a same WiFi fingerprint exceeds a first threshold, determining the two POIs as being in a neighboring relationship.

8. The device according to claim 7, wherein,
the operation of determining a POI respectively corresponding to each AP in each WiFi fingerprint comprises:
determining a POI respectively corresponding to each AP in each WiFi fingerprint according to a pre-established correspondence relationship between the AP and the POI.

9. The device according to claim 7, wherein,
the operation of when the number of times that APs respectively corresponding to any two POIs are included in a same WiFi fingerprint exceeds a first threshold, determining the two POIs as being in a neighboring relationship comprises:
every a time period, performing statistics and analysis for WiFi fingerprints obtained in the time period, and determining the two POIs as being in the neighboring relationship when it is determined that the number of times that APs respectively corresponding to any two POIs are included in a same WiFi fingerprint exceeds the first threshold.

10. The device according to claim 9, wherein,
the operation further comprises:
regarding two POIs determined in the neighboring relationship, when the WiFi fingerprints obtained in continuous N time periods are determined as being void of the situation that APs respectively corresponding to the two POs are included occur in a same WiFi fingerprint, deleting the neighboring relationship between the two POIs, N being a positive integer greater than one.

11. The device according to claim 9, wherein,
the operation further comprises:
determining a hierarchical relationship between the POIs according to the determined neighboring relationship between the POIs.

12. The device according to claim 11, wherein,
the operation of determining the hierarchical relationship between the POIs according to the determined neighboring relationship between the POIs comprises:
as for each POI in the neighboring relationship, when the number of POIs in the neighboring relationship with the PO is determined as being greater than a second threshold, determining that the POI as a high-level POI, and determining a non-high-level POI in the neighboring relationship with the high-level PO as a low-level POI of the high-level PO.

13. A non-transitory computer storage medium, wherein the computer storage medium is coded with a computer program, and when the program is executed by one or more computers, the one or more computers perform the following operation:
- obtaining a plurality of WiFi fingerprints uploaded by a user, each of the plurality of WiFi fingerprints comprises information of a wireless access point AP listing at the location where a user locates;
- determining a Point of Interest (POI) respectively corresponding to each AP in each WiFi fingerprint of plurality of WiFi fingerprints;
- when the number of times that APs respectively corresponding to any two POIs are included in a same WiFi fingerprint exceeds a first threshold, determining the two POIs as being in a neighboring relationship.

14. The computer storage medium according to claim 13, wherein,
- the operation of determining a POI respectively corresponding to each AP in each WiFi fingerprint comprises:
- determining a POI respectively corresponding to each AP in each WiFi fingerprint according to a pre-established correspondence relationship between the AP and the POI.

15. The computer storage medium according to claim 13, wherein,
- the operation of when the number of times that APs respectively corresponding to any two POIs are included in a same WiFi fingerprint exceeds a first threshold,
- determining the two POIs as being in a neighboring relationship comprises:
- every a time period, performing statistics and analysis for WiFi fingerprints obtained in the time period, and determining the two POIs as being in the neighboring relationship when it is determined that the number of times that AI's respectively corresponding to any two POIs are included in a same WiFi fingerprint exceeds the first threshold.

16. The computer storage medium according to claim 15, wherein,
- the operation further comprises: regarding two POIs determined in the neighboring relationship, when the WiFi fingerprints obtained in continuous N time periods are determined as being void of the situation that APs respectively corresponding to the two POIs are included in a same WiFi fingerprint, deleting the neighboring relationship between the two POIs, N being a positive integer greater than one.

17. The computer storage medium according to claim 15, wherein,
- the operation further comprises:
- determining a hierarchical relationship between the POIs according to the determined neighboring relationship between the POIs.

18. The computer storage medium according to claim 17, wherein,
- the operation of determining the hierarchical relationship between the POIs according to the determined neighboring relationship between the POIs comprises:
- as for each POI in the neighboring relationship, when the number of POIs in the neighboring relationship with the POI is determined as being greater than a second threshold, determining that the POI as a high-level POI, and determining a non-high-level POI in the neighboring relationship with the high-level POI as a low-level POI of the high-level POI.

* * * * *